(12) United States Patent
Ichikawa

(10) Patent No.: US 11,796,303 B2
(45) Date of Patent: Oct. 24, 2023

(54) SHEET THICKNESS MEASUREMENT DEVICE

(71) Applicant: Maysun Corporation, Shizuoka (JP)

(72) Inventor: Shigeru Ichikawa, Fujinomiya (JP)

(73) Assignee: Maysun Corporation, Shizuoka (JP)

( * ) Notice: Subject to any disclaimer, the term of this patent is extended or adjusted under 35 U.S.C. 154(b) by 663 days.

(21) Appl. No.: 16/981,225

(22) PCT Filed: Mar. 15, 2019

(86) PCT No.: PCT/JP2019/010941
§ 371 (c)(1),
(2) Date: Sep. 15, 2020

(87) PCT Pub. No.: WO2019/177161
PCT Pub. Date: Sep. 19, 2019

(65) Prior Publication Data
US 2021/0025687 A1   Jan. 28, 2021

(30) Foreign Application Priority Data
Mar. 16, 2018   (JP) ................. 2018-049505

(51) Int. Cl.
*G01B 7/06*   (2006.01)
*G01B 11/06*   (2006.01)

(52) U.S. Cl.
CPC .......... *G01B 7/107* (2013.01); *G01B 11/0691* (2013.01)

(58) Field of Classification Search
CPC .... G01B 7/107; G01B 11/0691; G01B 21/08; G01B 7/06; G01B 11/06; Y02E 60/10
(Continued)

(56) References Cited

U.S. PATENT DOCUMENTS 5,075,622 A * 12/1991 Konii ................... G01B 7/107
324/229

FOREIGN PATENT DOCUMENTS

EP   0422545 A2   4/1991
JP   H03-123811 A   5/1991
(Continued)

OTHER PUBLICATIONS

International Search Report issued in PCT/JP2019/010941; dated Jun. 11, 2019.
(Continued)

*Primary Examiner* — Farhana A Hoque
(74) *Attorney, Agent, or Firm* — Studebaker & Brackett PC

(57) ABSTRACT

Provided is a sheet thickness measurement device capable of increasing measurement density and measurement accuracy over the entirety of a sheet to be measured. Based of a difference between a sheet thickness signal at a position of a backup roll where the sheet exists, and a sheet thickness signal at a position of the backup roll where the sheet does not exist, the sheet thickness signals from the plurality of sheet thickness sensors are zero-adjusted in association with the position of the surface of the backup roll. Based on an output signal from a magnetic sensor in a state in which the sheet is not present on the backup roll, the sheet thickness signals from the plurality of sheet thickness sensors in a state in which the sheet is present on the backup roll are corrected in association with the position of the surface of the backup roll. This enables high-density and accurate sheet thickness measurement.

8 Claims, 7 Drawing Sheets

(58) Field of Classification Search
USPC .......................................................... 324/226
See application file for complete search history.

(56) References Cited

FOREIGN PATENT DOCUMENTS

| | | |
|---|---|---|
| JP | H08-219747 A | 8/1996 |
| JP | H11-183155 A | 7/1999 |
| JP | H11-344328 A | 12/1999 |

OTHER PUBLICATIONS

Office Action issued in JP 2018-049505; mailed by the Japanese Patent Office dated Feb. 3, 2020.
Hirakawa S. et al; "Highly Accurate Measurement of Sheet Thickness: The Planar Error Correction"; IEEE Transactions on Applied Superconductivity; Jun. 1, 2004; pp. 1810-1813; vol. 14; No. 2; XP011117708; IEEE, Los Alamitos, CA, US.
The extended European search report issued by the European Patent Office dated Nov. 3, 2021, which corresponds to European Patent Application No. 19766914.6-1010 and is related to U.S. Appl. No. 16/981,225.
An Office Action mailed by the Japanese Patent Office dated Oct. 1, 2020, which corresponds to Japanese Patent Application No. 2018-049505 and is related to U.S. Appl. No. 16/981,225.
International Preliminary Report on Patentability and Written Opinion issued in PCT/JP2019/010941; dated Sep. 22, 2020.

\* cited by examiner

SHEET THICKNESS MEASUREMENT DEVICE

TECHNICAL FIELD

The present invention relates to sheet thickness measurement, and particularly to a sheet measurement device capable of increasing measurement density and measurement accuracy over the entirety of a sheet to be measured.

BACKGROUND ART

There has been an increasing number of cases where it is required to manage, with high accuracy and density, the thickness of a sheet which is manufactured in a sheet manufacturing line. Further, there has been an increasing need to measure the thickness of a sheet, without allowing a thickness measurement instrument to come into direct contact with the sheet so as to prevent an unintentional negative influence on the sheet, such as damage to the sheet, during the sheet thickness measurement, and in an online manner, i.e., with a quick coping capability.

Heretofore, there has been known a sheet thickness measurement device for measuring the thickness of a sheet such as a paper sheet or a plastic sheet, using a combination of a magnetic field-based sensor and an optical sensor (the following Patent Document 1).

CITATION LIST

Parent Document

Parent Document 1: JP H03-123811A

SUMMARY OF INVENTION

Technical Problem

However, heretofore, when measuring the thickness of a target sheet, the measurement has been performed using a single sheet thickness sensor unit. In this case, the sheet thickness measurement has been performed while the single sheet thickness sensor unit is scanningly moved in a given direction above a metal backup surface supporting a sheet which is a target of the thickness measurement. However, in the measurement using only the single sheet thickness sensor unit moved over the surface of a sheet on a backup roll being rotated, only a trajectory of a single senor scanning line will represent a result of the sheet thickness measurement, so that there is a limit to increasing the density of measurement of the thickness of a target sheet.

On another view, a target of thickness measurement has heretofore generally been a paper or plastic sheet as described in Reference 1, but there has recently arisen a new situation where a material for a sheet which is the target of thickness measurement becomes diversified.

Specifically, there has been recently a need for thickness measurement of a sheet-shaped member used as, e.g., an electrode material or a separator material for a lithium battery or the like, in addition to a paper or plastic sheet.

A recent lithium-ion battery is manufactured using a multi-layer structure of sheet-shaped electrode members. Such a sheet material requires sheet quality exhibiting higher homogeneity in its entirety. In order to improve equality in the recent situation where a sheet material requires sheet quality exhibiting higher homogeneity in its entirety, it becomes an important factor to improve accuracy in sheet thickness and increase the measurement density.

The reason includes an increasing social need for higher sheet equality in terms of safety of a sheet material to be used, because of the recent occurrence of an accident which seems to be caused by a structural defect of a lithium battery or the like. In order to accurately measure the thickness of a sheet and adequately feed back the measurement result to a sheet manufacturing line, in a sheet manufacturing process, under such diversification of a sheet material requiring thickness measurement, it is required to measure the sheet thickness in higher density, e.g., by increasing a moving speed of a sheet thickness sensor, or increasing the number of sheet thickness measurement points.

It is therefore an object of the present invention to provide a sheet thickness measurement device capable of, in a sheet thickness measurement used for various purposes, increasing measurement density without impairing measurement accuracy, over the entirety of a sheet to be measured.

Solution to Technical Problem

In order to achieve the above object, the present invention provides a sheet thickness measurement device equipped with a plurality of sheet thickness sensors.

Specifically, the present invention provides a sheet thickness measurement device equipped with a plurality of sheet thickness sensors each operable, using a magnetic sensor and an optical sensor, to measure a thickness of a sheet based on output signals from the magnetic sensor and the optical sensor, wherein the sheet thickness measurement device is configured such that the plurality of sheet thickness sensors are operated to scan independently of each other.

Then, the sheet thickness measurement device comprises a backup roll for supporting the sheet, and scanning means to operate each of the sheet thickness sensors to scan in association with a position of a surface of the backup roll.

As a preparatory stage of the measurement, the sheet thickness measurement device of the present invention has a configuration for an operation, so-called "zero-reading". This operation comprises reading an output of each of the sheet thickness sensors in a state in which the sheet is not present on the backup roll. This configuration comprises: without-sheet magnetic data storage means to store therein, in association with the position of the surface of the backup roll, a measurement result regarding a distance between the surface of the backup roll and the magnetic sensor of each of the sheet thickness sensors, obtained from said magnetic sensor at each measurement position by scanningly moving the sheet thickness sensors over an entire region of the surface of the backup roll ranging beyond a width of the sheet, in a state in which the sheet is not present on the backup roll; without-sheet optical data storage means to store therein, in association with the position of the surface of the backup roll, a measurement result regarding a distance between the surface of the backup roll and the optical sensor of each of the sheet thickness sensors, obtained from said optical sensor at each measurement position by scanningly moving the sheet thickness sensors over the entire region of the surface of the backup roll ranging beyond the width of the sheet, in the state in which the sheet is not present on the backup roll; and without-sheet thickness data forming means to create, based on data stored in the without-sheet magnetic data storage means and the without-sheet optical data storage means, data regarding a distance between the surface of the backup roll and each of the thickness sensors at each measurement position, associated with the position of the surface of the backup roll over the entire region of the surface of the backup roll ranging beyond the width of the sheet. The output from each of the sheet thickness sensors in the state in which the sheet is not present on the backup roll (in a without-sheet state) is figured out and read in advance. In this zero-reading, correction processing is performed such that the output from each of the sheet thickness sensors becomes zero, because the output is obtained in a without-sheet state.

Here, the reason that the zero-reading is performed in the present invention will be described. A difference in output of raw data between the magnetic sensor and the optical sensor as measured on the same surface of a metal backup roll supporting a sheet is up to about several ten μm in terms of the sheet thickness. The reason for this is that an output characteristic of the magnetic sensor largely and complicatedly changes as compared to a change in output characteristic of the optical sensor. This is because local magnetization, material unevenness, etc., of a metal backup roll cause an output fluctuation of the magnetic sensor. Further, it is known that, in a case where a magnetic body is used as the metal backup roll, when the magnetic sensor performs a scanning operation after being locally magnetized (by about several Gauss) by attaching a magnet or the like to a portion thereof, the output of the magnetic sensor exhibits a fluctuation corresponding to a sheet thickness of several ten μm. Further, even in a region of the surface of the backup roll in which no output fluctuation is observed in a gaussmeter, the output of the magnetic sensor can largely fluctuate in a part of the region. This phenomenon also occurs in a case where a non-magnetic body is used as the metal backup roll, and an eddy-current magnetic sensor is used. An error based on the output fluctuation of the magnetic sensor exerts a negative influence on measurement accuracy of this type of sheet thickness device.

In this embodiment, with a view to eliminating the negative influence on the accuracy of sheet thickness measurement due to the situation where a magnetic characteristic with respect to the surface of the backup roll varies with location, the zero-reading is performed in the aforementioned procedure. By performing such processing, the sheet thickness measurement device of the present invention can suppress an error in the sheet thickness measurement to about 1 μm or less.

In accord with performing such zero-reading, the sheet thickness measurement device of the present invention has a configuration for a sheet thickness measurement operation.

This configuration comprises: with-sheet magnetic data storage means to store therein, in association with the position of the surface of the backup roll, a measurement result regarding a distance between a surface of the sheet and the magnetic sensor of each of the sheet thickness sensors, obtained from said magnetic sensor in a state in which the sheet is present on the backup roll; with-sheet optical data storage means to store therein, in association with the position of the surface of the backup roll, a measurement result regarding a distance between the surface of the sheet and the optical sensor of each of the sheet thickness sensors, obtained from said optical sensor in the state in which the sheet is present on the backup roll; with-sheet thickness data forming means to create, based on data stored in the with-sheet magnetic data storage means and the with-sheet optical data storage means, data regarding a distance between the surface of the sheet and each of the thickness sensors, associated with the position of the surface of the backup roll; and reference measurement value setting means to associate a difference between the data of the without-sheet thickness data forming means and the data of the with-sheet thickness data forming means, with the position of the surface of the backup roll, to set a reference measurement value of the sheet thickness.

Further, as one feature of the present invention, the sheet thickness measurement device includes a configuration for performing an operation, so-called "zero-adjustment". The "zero-adjustment" in the present invention means a correction of a change in magnetic characteristic obtained when actually performing the thickness measurement for the sheet on the backup roll, specifically, an output of each of of the optical sensor and the magnetic sensor as compared to that during the "zero-reading", due to temperature change or the like, i.e., a correction of an offset error.

The configuration for performing the "zero-adjustment" comprises: with-sheet magnetic correction data storage means provided in at least one of the plurality of thickness measurement sensors to store therein, in association with the position of the surface of the backup roll, a measurement result regarding a distance between the surface of the backup roll and the magnetic sensor of the at least one thickness measurement sensor, obtained from said magnetic sensor in the state in which the sheet is present on the backup roll and above a region of the backup roll beyond a range in which the sheet is present on the backup roll; with-sheet optical correction data storage means provided in the at least one thickness measurement sensor to store therein, in association with the position of the surface of the backup roll, a measurement result regarding a distance between the surface of the backup roll and the optical sensor of the at least one thickness measurement sensor, obtained from said optical sensor in the state in which the sheet is present on the backup roll and in the region on the backup roll beyond the range in which the sheet is present on the backup roll; and zero-adjustment correction data forming means to create, based on data stored in the with-sheet magnetic correction data storage means and the with-sheet optical correction data storage means, zero-adjustment correction data regarding the distance between the surface of the sheet and the at least one sheet thickness sensor, associated with the position of the surface of the backup roll, Essentially, the zero-adjustment means, in a situation where the sheet is transferred on the backup roll, comparing an output of the at least one sheet thickness sensor at a position where the sheet does not exist, i.e., at a position on a region of the surface of the backup roll beyond the width of the sheet, with an output of the at least one sheet thickness sensor at the same position of the surface of the backup roll during the zero-reading, and performing correction, based on a difference between the two outputs, as an offset error. Because the sheet does not exist on the region of the surface of the backup roll beyond the width of the sheet, the output of the at least one sheet thickness sensor must be zero. However, when a circumstance such as the temperature of the surface of the backup roll changes, a magnetic output of the at least one sheet thickness sensor also changes. Thus, even at the same position of the surface of the backup roll, an output value of the at least one sheet thickness sensor varies between during the zero-reading and during actual sheet measurement, which gives rise to the need for the offset error correction.

In the present invention, an operation of correcting, based on the offset error, an output value of the at least one sheet thickness sensor in a region of the surface of the backup roll in which the sheet is present thereon is referred to as "zero-adjustment".

Then, the sheet thickness measurement device has a configuration for acquiring a final value of the sheet thickness.

As the configuration for acquiring the final value of the sheet thickness, the sheet thickness measurement device is configured to, based on the zero-adjustment correction data created by the zero-adjustment correction data forming means, subject the reference measurement values of the sheet thickness at each measurement position of the at least one sheet thickness sensor, to zero adjustment, in association with the position of the surface of the backup roll, thereby obtaining final measurement values of the sheet thickness at each measurement position of the at least one sheet thickness sensor.

In a preferred embodiment of the present invention, the sheet thickness measurement device comprises a support mechanism supporting the plurality of sheet thickness sensors to allow each of the sheet thickness sensors to scan the sheet on the backup roll independently.

More specifically, in the preferred embodiment, the plurality of sheet thickness sensors may be composed of two sheet thickness sensors which are attached to the support mechanism such that they can be operated to scan above the backup roll independently of each other.

Alternatively, in the preferred embodiment, the plurality of sheet thickness sensors may be composed of three sheet thickness sensors which are attached to the support mechanism such that they can be operated to scan above the backup roll independently of each other.

In another preferred embodiment of the present invention, the sheet thickness measurement device of the present invention is configured such that each of the sheet thickness sensors is operated to scan above the surface of the backup roll in a non-contact state with respect to the backup roll.

This makes it possible to prevent accidental damage to the sheet.

In yet another preferred embodiment of the present invention, the remaining one or more sheet thickness sensors other than the at least one sheet thickness sensor are subjected to zero-adjustment, based on the measurement result pertaining to the zero-adjustment for the at least one sheet thickness sensor. This makes it possible to simplify the zero-adjustment operation for the thickness sensors.

In still another preferred embodiment of the present invention, each of the sheet thickness sensors comprises a projector configured to emit light onto a top region of the sheet lying on the backup roll, and a light-receiving element comprised of a plurality of pixels configured to receive the light emitted from the projector, wherein each of the sheet thickness sensors is configured to acquire a position of a top of the sheet, based on a change in luminous intensity of the light-receiving element over the plurality of pixels, and obtain the sheet thickness, based on the determined position of the top of the sheet. This makes it possible to improve measurement accuracy and lead to downsizing of the device.

Further, the above support mechanism preferably comprises a single linear rail supporting the plurality of sheet thickness sensors in a movable manner. This makes it possible to structurally simplify the device and achieve downsizing of the device.

Effect of Invention

The present invention can provide a sheet thickness measurement device capable of increasing measurement density and measurement accuracy over the entirety of a sheet to be measured, without reducing measurement speed.

DESCRIPTION OF EMBODIMENTS

With reference to FIGS. 1 to 4 in the accompanying drawings, the present invention will now be described in more detail, based on a first embodiment thereof.

Figure 1:
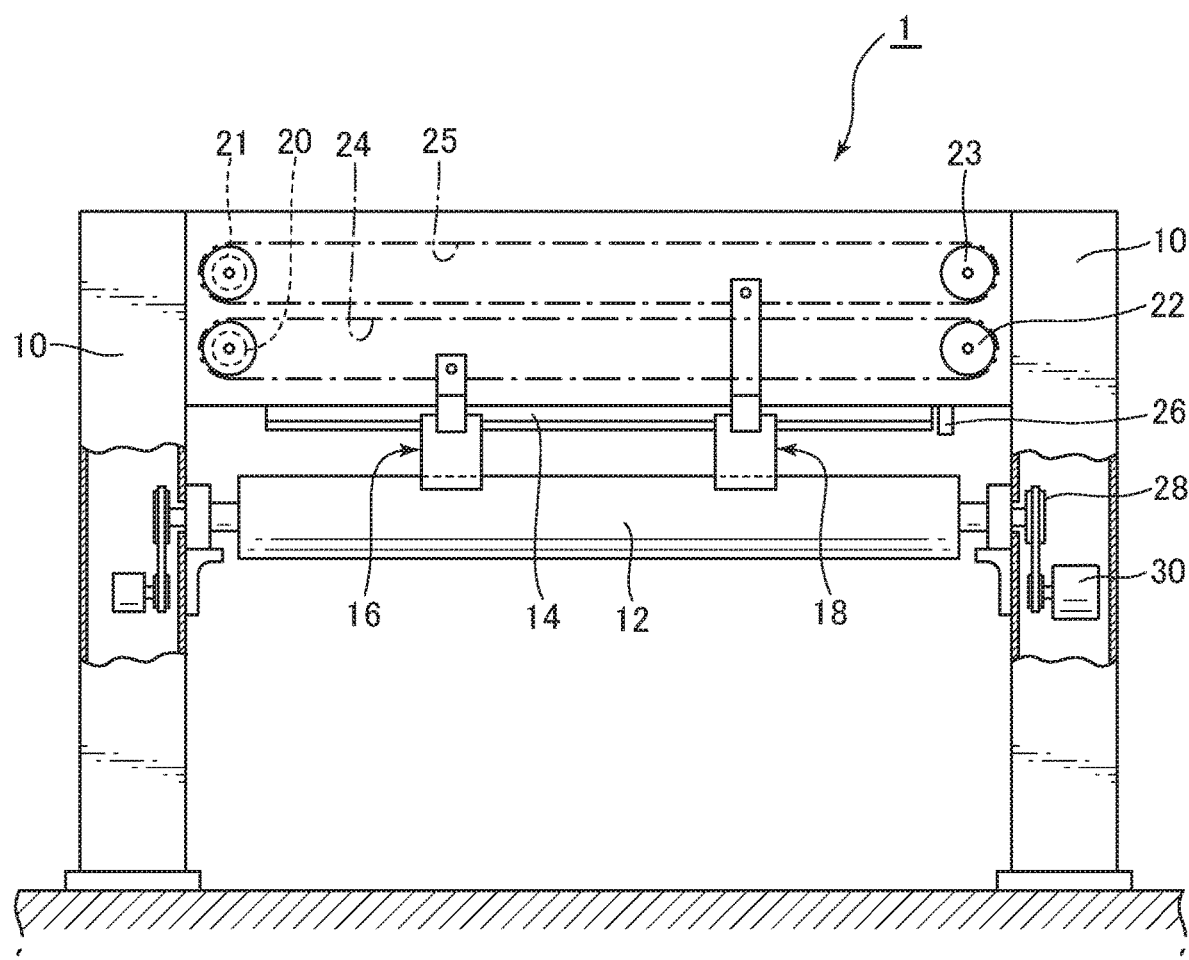
FIG. 1 is a schematic elevation view showing a mechanical configuration part of a sheet thickness measurement device according to a first embodiment of the present invention, wherein the sheet thickness measurement device is equipped with two sheet thickness sensors and configured to be capable of performing sheet thickness measurement in an online manner.
Figure 2:
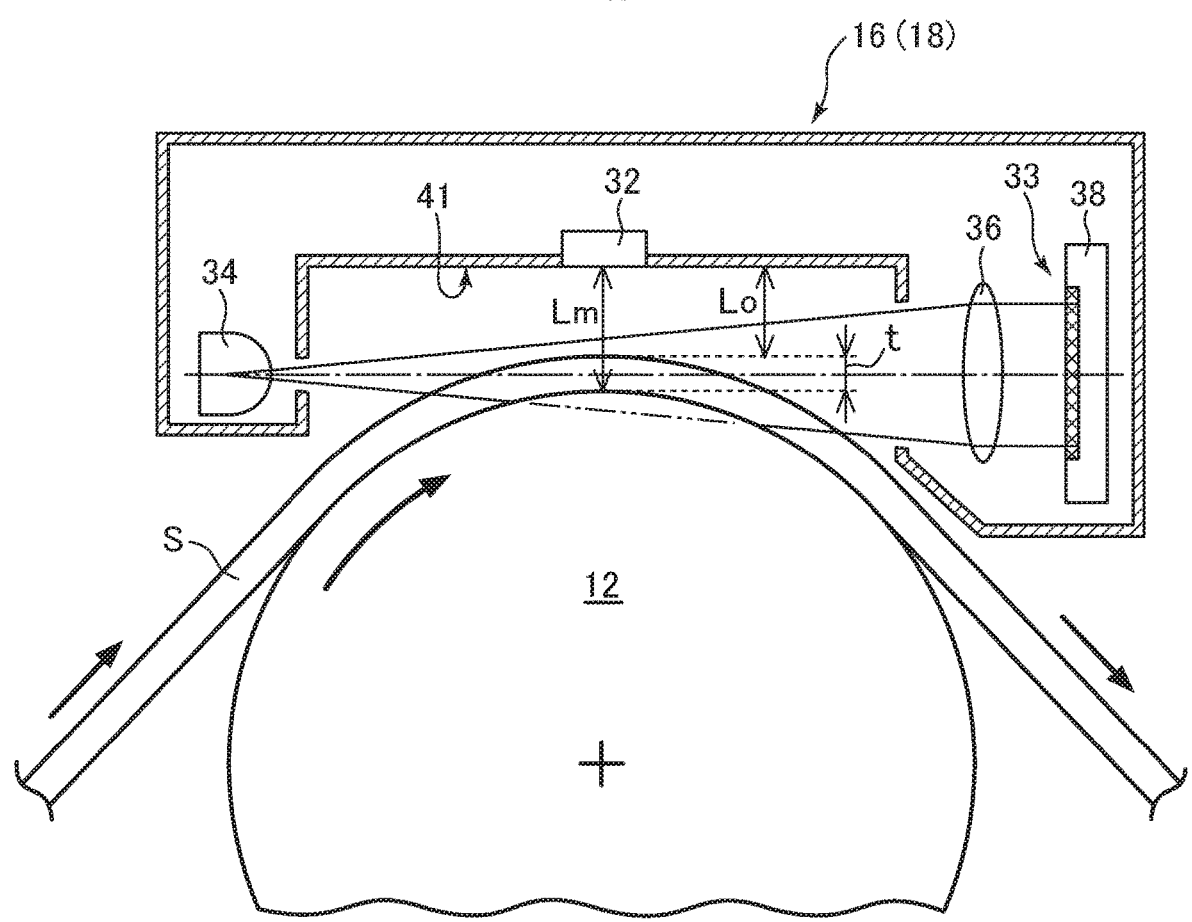
FIG. 2 is an explanatory view showing a cross-section of one of the sheet thickness sensors of the thickness measurement device according to the first embodiment illustrated in FIG. 1.

FIG. 1 is a front view showing a schematic structure of a sheet thickness measurement device 1 according to the first embodiment, and FIG. 2 is an enlarged side view thereof.

First of all, a support structure and a scanning mechanism for a plurality of sheet thickness sensors each operable to detect the thickness of a target sheet will be described.

As shown in FIG. 1, a metal backup roll 12 extending horizontally is supported between a pair of support frames 10 extending vertically in spaced-apart relation. Further, a linear rail 14 is also supported between the support frames 10 such that it is disposed just above and in spaced-apart relation to the metal backup roll 12 to extend parallel to the metal backup roll 12. In this embodiment, two sheet thickness sensors 16, 18 are slidably supported by the linear rail 14, such that each of them can be scanningly moved along the linear rail 14 being rotated.

In this embodiment, the thickness of the sheet S is measured using the two sheet thickness sensors 16, 18, so that it is possible to increase measurement density, and enable a variety of thickness measurements according to intended purposes, properties, etc., of the sheet.

Each of the sheet thickness sensors 16, 18 is connected, respectively, to two chains (timing belts) 24, 25 each wound around between a respective one of two pairs of timing timing pulleys (chain wheels) 22, 23 each driven by a corresponding one of two scanning stepping motors 20, 21.

The sensors 16, 18 are movable along the linear rail 14 independently of each other, according to actuation of the scanning stepping motors 20, 21. Further, in the vicinity of a right one of the chain wheels 22 in FIG. 1, an origin sensor 26 to detect and store therein an origin of movement, i.e., a start position of movement, of each of the sheet thickness sensors 16, 18 is disposed. Further, each of the support frames 10 is provided with a roll-rotation detection transducer (rotary encoder) 28 for detecting a rotational position of the backup roll 12, and a backup-roll drive motor 30. That is, the position of the surface of the backup roll 12 and respective positions of the sheet thickness sensors 16, 18 are accurately traced by the after-mentioned computer for processing a signal from the rotary encoder 28.

As shown in FIG. 2, the sheet thickness sensor 16 (since the sheet thickness sensor 18 is structurally the same as the sheet thickness sensor 16, description of the sheet thickness sensor 16 will be used as a substitute for that of the sheet thickness sensor 18, and duplicated description will be omitted) comprises: a magnetic sensor 32 disposed just above the backup roll 12; and an optical sensor 33 which comprises a projector 34 equipped with an LED or the like, a light-receiving lens 36, and a light-receiving element (e.g., linear image sensor) 38. The magnetic sensor 32 and the optical sensor 33 constitute the sheet thickness sensor 16 (18) while being held in an integral positional relationship with respect to a reference surface 41.

The light-receiving element 38 serves as an important component of the optical sensor 33. A signal to be generated from the light-receiving element 38 is a signal indicative of the position of a top surface of the backup roll 12, or a signal indicative of the position of a top surface of the sheet S in a state in which the sheet S is placed on the surface of the backup roll 12. Thus, this signal can be analyzed to form a signal from the optical sensor 33 such that it indicates the position of the surface of the backup roll 12, or the position of the surface of the sheet S.

In this embodiment, the metal backup roll 12 is used as a measurement reference surface. In this case, it is important that the projector 34 and the light-receiving element 38 of the optical sensor 33 are arranged across a width direction of the metal backup roll 12, and a light incident angle is set such that beam-like light from the projector to the light-emitting element 38 is blocked out by the thickness of the sheet S on the metal backup roll 12.

A basic operation of the sheet thickness sensor 16 (18) is as follows.

The magnetic sensor 32 is disposed vertically above the top of the backup roll 12.
By analyzing a magnetic force from the magnetic sensor 32, it is possible to measure a distance from the magnetic sensor 32 to the surface 8 of the backup roll 12.

Next, the optical sensor 33 will be described. As mentioned above, the optical sensor 33 comprises the projector 34 equipped with an LED or the like, the light-receiving lens 36, and the light-receiving element 38.

The projector 34 is configured to emit light from the LED or the like to a region in the vicinity of the top of the backup roll 12. Then, the light emitted to the backup roll partly reaches the light-receiving element 38 via the light-receiving lens 36. However, the remaining part of the light from the projector 34 is blocked out by the backup roll or the top surface of the sheet S lying on the backup roll, so that it cannot reach the light-receiving element. In other words, light emitted from the projector 34 to the backup roll or the sheet S on the backup roll is divided into two pieces of light; one capable of reaching the light-emitting element 38; and the other incapable of reaching the light-emitting element 38. Thus, by emitting light from the projector 34 to the vicinity of the top of the backup roll 12, it is possible to project a top region of the backup roll 12 onto the light-receiving element 38.

Specifically, a boundary line between a region of the light-receiving element 38 where light from the projector 34 reaches, i.e., a bright region where the light-receiving element 38 is irradiated with the light, and a dark region where the light from the projector 34 does not reach, is defined by the top of the backup roll 12, so that it indicates a trajectory or line of the top of the backup roll 12.

A sheet thickness measurement method will be described in principle. The thickness of the sheet on the surface of the backup roll can be measured by subtracting an output value from the optical sensor indicative of a distance from the magnetic sensor to the surface of the sheet S, from an output value from the magnetic sensor indicative of a distance from the magnetic sensor to the surface of the backup roll through the sheet S.

The above can be expressed by the following formula 1).

$$Lm-Lo=t \qquad 1),$$

where t: the sheet thickness, Lm: the output (measurement value) of the magnetic sensor, and Lo: the output (measurement value) of the optical sensor.

According to this method in this embodiment, magnetic field lines from the magnetic sensor (static magnetic field type) 32 catch the top of the backup roll 12. On the other hand, in a situation where the sheet S is present on the backup roll 12, magnetic field lines from the magnetic sensor 32 can catch the top of the backup roll 12, as with the situation where the sheet S is not present on the backup roll 12.

Thus, the thickness of the sheet S can be measured by subtracting the output from the light-receiving element 38 receiving light emitted from the projector 34, from the output from the magnetic sensor 32. Although this method also includes processing (zero-adjustment) for coping with a situation where an output of each of the optical sensor and the magnetic sensor undergoes a temperature drift due to a temperature change around the thickness sensor, thereby exerting a negative influence on the accuracy of the sheet thickness measurement, the processing will be described later.

In this embodiment, the position of the surface of the backup roll can be measured by processing the position of a shadow in the pixels of the light-receiving element through a signal processing circuit. For example, assuming that one pixel has a width of 1 [μm] in a case where the light-receiving element 38 has 1000 pixels, the light-receiving element 38 can measure a range of 1 [mm]. It has been verified that, in the above method, even when the sheet S is transparent, light from the projector 34 cannot reach the light-receiving element because the light passes through a position approximately along the surface of the sheet. That is, as long as the sheet S is present, light from the projector 34 does not reach the light-receiving element 38 even when the sheet is transparent. Thus, the thickness of the sheet S can be measured by analyzing a luminous intensity distribution of the light-receiving element 38.

In view of the above knowledge, the present inventor has focused on the fact that there is a pixel existing between a region exposed to light from the projector 34 and a region unexposed to the light, i.e., there are a plurality of pixels which are different in terms of luminous intensity level, in a boundary region between light and shadow. In this embodiment, the luminous intensity level of each pixel is subjected to A/D conversion, and stored in a memory as digital data. Then, interpolation between pixel values of the pixels is performed using the A/D-converted digital data. This makes it possible to further improve the accuracy of the thickness measurement.

Specifically, a change per pixel in luminous intensity level in received-light waveforms of the plurality of pixels existing in the boundary region is tracked. For example, a luminous intensity level which is one-half of a maximum value of a received-light waveform of a specific pixel is used as a threshold, and the position of one of the pixels having a luminous intensity level closest to the threshold is acquired. Respective positions of the pixels are preliminarily figured out in relationship with the surface of the backup roll and the reference surface 41 of the optical sensor 33. Then, in the light-receiving element 39 receiving light emitted from the projector 34, a change per pixel in light intensity, i.e., luminous intensity level, is tracked. By repeating this operation, it is possible to acquire change in luminous intensity, i.e., a sloped line indicative of luminous intensity level, based on the position of each pixel. For example, the thickness of the sheet S can be calculated by acquiring a position from the reference surface 41 corresponding to an intersection point on the sloped line at the threshold as one-half of the maximum value of luminous intensity. By determining the thickness of the sheet S in this manner, it is possible to acquire the thickness of the sheet S at a level smaller than the size of the pixel. That is, the accuracy of the sheet thickness measurement can be increased accordingly. Further, as a result of this, it becomes possible to use a linear image sensor having a less number of pixels. For example, highly-accurate thickness measurement can be conducted even using a small-size sensor having about 256 pixels. Further, a lens having a smaller diameter can be used in an optical system, which makes it possible to downsize the thickness sensor. Downsizing of the thickness sensor makes it possible to downsize the thickness measurement device. Further, downsizing of the thickness sensor also provides an advantage of making it easy to ensure a zero-adjustment region outside the edge of the sheet.

Figure 3:
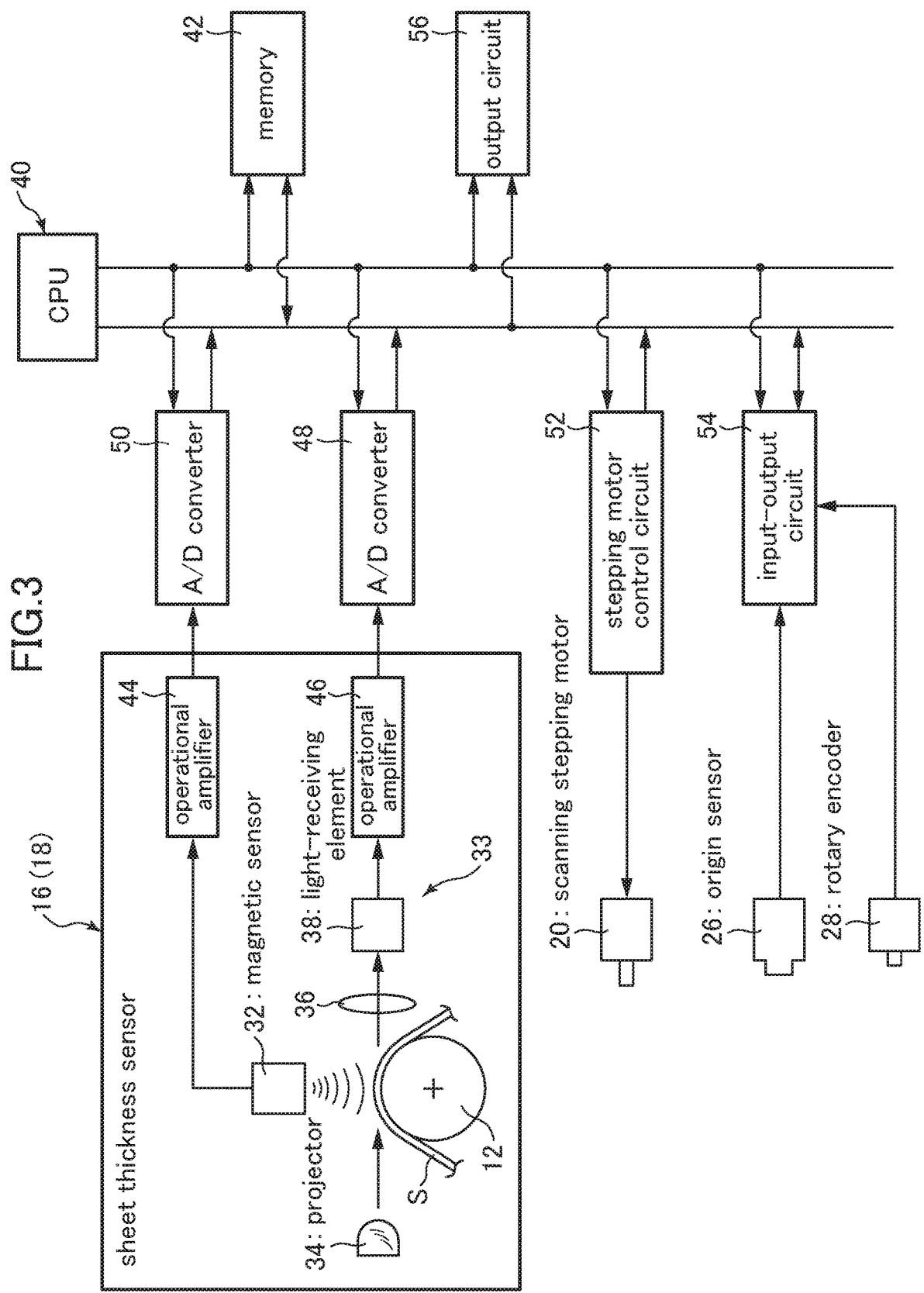
FIG. 3 is a block diagram showing a control system of the thickness measurement device according to the first embodiment illustrated in FIG. 1.

FIG. 3 is a block diagram showing the configuration of a control part of the sheet thickness measurement device illustrated in FIGS. 1 and 2. As shown in FIG. 3, this control part mainly comprises: a control computer 40 including a central processing unit (CPU) composed of a microcomputer or the like; a memory 42 for storing therein a variety of measurement data; an operational amplifier 44 configured to amplify a distance measurement signal by the magnet sensor of the sheet thickness sensor 16 (18); an operational amplifier 46 configured to process a blocked-light width measurement signal by the optical sensor of the sheet thickness sensor 16 (18); two A/D converters 48, 50 each for converting, to digital data, a measurement signal indicative of an analog value operationally amplified by a corresponding one of the operational amplifiers 44, 46; a stepping motor control circuit 52 for controlling operations of the scanning stepping motor 20, the rotary encoder 28 and others; an input-output circuit 64 for the origin sensor 26; and an output circuit 56 for outputting a measurement result to an LCD, a recorder, a printer and others.

Next, the operation of the thickness measurement device will be described.

As shown in FIG. 1, the backup roll 12 is configured to be rotationally driven by the backup-roll drive motor 30. The rotary encoder 28 is attached to the end of a shaft of the backup roll 12. That is, the sheet thickness measurement device 1 is configured to be capable of figuring out a rotational origin (start point) and a rotational amount of the backup roll 12. On the other hand, with regard to respective positions of the thickness sensor 16 (18), the scanning stepping motor 20 for a sensor moving mechanism is configured to be driven according to a pulse signal generated by the rotary encoder 28. That is, the sheet thickness measurement device 1 has a circuit configuration capable of tracking or monitoring the rotational position of the backup roll 12. Then, the sheet thickness measurement device 1 is configured such that the rotation of the scanning stepping motor 20 is transmitted by the timing timing pulleys (chain wheels) 22 and the chain (timing belt) 24, so as to move the thickness sensor 16 mounted to the linear rail 14, independently of the thickness sensor 18, and the position of the thickness sensor 16 (18) on the linear rail 14 can be tracked or monitored.

In this case, the thickness sensor 18 shares the linear rail 14 with the thickness sensor 16, but associated with the scanning stepping motor 21, the timing timing pulleys (chain wheels) 23 and the chain (timing belt) 25, independently, so that the thickness sensor 18 can scan the surface of the backup roll 12, independently of the thickness sensor 16.

Since the thickness sensor 18 can be scanning-controlled in the same manner as that in the thickness sensor 16, description of the operation of the thickness sensor 18 will be omitted, and only the operation of the thickness sensor 16 will be described below.

First of all, in order for operation of the thickness measurement device, preparation for each component is performed. In this setup operation, the control computer 40 illustrated in FIG. 3 operates to drive the scanning stepping motor 20 to move the origin sensor 26 to an origin position and keep the thickness sensor 16 in a standby state at this position (Measurement Setup)

As measurement setup, the thickness sensor 16 is scanning moved above the surface of the backup roll 12 to measure and record a magnetic characteristic with respect to the surface of the backup roll 12 prior to start of an actual sheet thickness measurement operation. In this specification, this operation is referred to as "reference value-storing scanning" or "zero-reading" for reading of a reference value.

In this operation, the surface of the roll is cleaned up in a state in which the sheet is not present on the backup roll 12.

Then, in the state in which the sheet is not placed on the backup roll 12, the control computer 40 first operates to send an instruction to the scanning stepping motor 20 to cause the sheet thickness sensor 16 to be set at the origin position. That is, the scanning stepping motor 20 is activated to move the sheet thickness sensor 16 to a position where the origin sensor 26 functions.

Subsequently, scanning by the sheet thickness sensor 16 is started from the origin position figured out by the origin sensor 26.

In this operation, the thickness sensor 16 is operated to scan above the backup roll 12 in any of various patterns to measure a magnetic characteristic with respect to the backup roll 12, in association with the position of the surface of the backup roll 12, and the magnetic characteristic obtained by this measurement is stored. This movement is performed according to the scanning stepping motor 20, wherein the scanning stepping motor 20 is driven in synchronization with pulses from the backup roll-rotation detection transducer (rotary encoder) 28. Specifically, for example, the sheet thickness sensor 16 and the sheet thickness sensor are operated to scan, respectively, in a profile mode (spiral pattern) and in a trend mode (slicing pattern), above the surface of the backup roll 12. In this case, what is important is that the sheet thickness sensor 16 always scans a constant route on the backup roll 12, and the position of the surface of the backup roll 12 is stored in association with a measurement value of the magnetic sensor 32.

Every time the sheet thickness sensor 16 performs the scan operation over a constant distance, a distance measurement signal indicative of a distance between the magnetic sensor 32 and the surface of the roll is stored in the memory 42 via the operational amplifier 44 and the A/D converter 50, and a light-blocking width measurement signal from the light-receiving element 38 of the optical sensor 33 is stored in the memory 42 via the operational amplifier 46 and the A/D converter 48. Here, the light-blocking width measurement signal from the light-receiving element 38 is based on a change in the amount by which the beam-like light from the projector 34 is blocked out only by the backup roll 12 at each measurement point, the amount of displacement of a light-blocking position at which the beam-like light from the projector 34 is blocked out only by the backup roll 12 at each measurement point, or the like. In other words, the light-blocking width is considered to be a variation in distance between the sheet thickness sensor 16 and the surface of the backup roll 12 at each measurement point. In this way, by comparing corresponding outputs of the magnetic sensor 32 with each other, it is possible to always know the magnetic characteristic at each measurement point on a scanning line, as an initial condition.

As just described, in this embodiment, the measurement setup operation is performed to cope with a situation where the magnetic characteristic with respect to the surface of the backup roll exerts an influence as an error factor.

Further, in parallel, a measurement result regarding a distance between the surface of the backup roll 12 and the optical sensor 33, obtained from the optical sensor 33 at each measurement position by scanningly moving the sheet thickness sensor 16 over the entire region of the surface of the backup roll 12 ranging beyond the width of the sheet S, in the state in which the sheet S is not present on the backup roll 12 is stored in the memory 42 in association with the position of the surface of the backup roll 12.

Then, data of the magnetic sensor 32 and data of the optical sensor 33 stored in the memory 42 are stored in the memory in association with the position of the surface of the backup roll 12.

As above, the movement of the thickness sensor 16 above the backup roll 12 in the measurement setup operation is accurately tracked or monitored.

The stored data corresponds to the thickness t of the sheet S expressed by the aforementioned formula 1) (Lm−Lo=t).

Further, because data about the sheet thickness in the state in which the sheet S is not present on the backup roll 12 is assumed to be zero, a difference from data of the sheet thickness sensor 16 measured in the state in which the sheet S is present on the backup roll 12 can be basically considered to indicate the sheet thickness. Thus, in this embodiment, a difference between the measurement values of the magnetic and optical sensors is associated with the position of the surface of the backup roll 12, and defined as a reference measurement value of the sheet thickness.

That is, in the measurement setup operation, the sheet S is not present on the backup roll 12, and therefore all the reference measurement values stored in the memory must be zero. Thus, the measurement values or outputs of the magnetic sensor 32 and the optical sensor 33 are processed such that they can be assumed to be zero in terms of the value t in the above formula 1), at each measurement position associated with the position of the surface of the backup roll 12, and stored.

(Sheet Thickness Measurement Operation)

Subsequently, in this embodiment, the sheet thickness sensor is operated to scan in the state in which the sheet S is actually placed on the backup roll 12, to perform a measurement operation.

When the thickness of the sheet on the backup roll 12 is actually measured, the following operation is performed.

A measurement result regarding a distance between the surface of the sheet. S and the magnetic sensor 32, obtained from the magnetic sensor 32 in the state in which the sheet S is present on the backup roll 12 is stored in the memory 42 in association with the position of the surface of the backup roll 12.

Further, a measurement result regarding a distance between the surface of the sheet S and the optical sensor 33, obtained from the optical sensor 32 in the state in which the sheet S is present on the backup roll 12 is stored in the memory 42 in association with the position of the surface of the backup roll 12.

Based on data from the magnetic sensor 32 and data from the optical sensor 33, data regarding the distance between the surface of the sheet S and the thickness sensor 16 associated with the position of the surface of the backup roll 12 is created.

Next, the scanning operation of the thickness sensor 16 (18) for an actual sheet thickness measurement (measurement scanning) will be described.

Scanning for actual sheet thickness measurement (measurement scanning) is performed in a state in which a target sheet to be subjected to the thickness measurement is placed on the backup roll 12. In the same manner as that in the reference value-storing scanning (measurement setup operation), the sheet thickness sensor 16 is moved from the origin again, and then, every time the sheet thickness sensor 16 reaches each measurement point, the control computer 40 operates to cause a distance measurement value (a distance between the magnetic sensor 32 and the top surface of the metal backup roll 12) from the magnetic sensor 32 at the moment, and a light-blocking width measurement value (a light-blocking width by the metal backup roll 12 and the thickness of the sheet S1) from the light-receiving element 38 of the optical sensor, to be stored in the memory 42.

Subsequently, the control computer 40 operates to compute the thickness of the sheet S based on the distance measurement value and the light-blocking width measurement value stored in the memory 42, and output the resulting value through the output circuit 56.

When the thickness sensor 16 (18) is scanningly moved along the linear rail 14 as mentioned above while the backup roll 12 is rotated, each of the thickness sensors 16, 18 scans the peripheral surface of the backup roll 12, wherein it is possible to control the thickness sensor 16 (18) such that it certainly passes through the same points. The output from the magnetic sensor 32 at that time is stored in the memory 42, and retained as a magnetic characteristic. In this case, the peripheral surface of the backup roll is scanningly moved in a spiral pattern, in a case where the sheet thickness measurement is performed in a profile mode for measuring a change in thickness, i.e., a thickness profile, in a width direction of the sheet Heretofore, it has been common to scanningly move the sensor over the entire width of the sheet to measure the thickness profile. However, in some situations, there is a possibility that it is desirable to stop the sensor at a widthwise fixed point to continuously perform the measurement in a machine direction. In such a thickness measurement operation, the thickness sensor 16 (18) can be operated in not only the above profile mode but also a trend mode for measuring a change in thickness in a longitudinal direction of the sheet S.

In the trend mode, the thickness measurement may be performed in a state in which the thickness sensor 16 (18) is immobilized at a desired position in the width direction of the sheet S. In this case, it is possible to obtain a thickness trend for one line in the longitudinal direction of the sheet S, at the widthwise position of the sheet S. After obtaining the thickness trend for the one line, the thickness sensor 16 is moved to another position in the width direction of the sheet S, and immobilized. In this state, the thickness measurement can be performed in the same manner to obtain a thickness trend for another line. For measurement in the trend mode, it is necessary to allow an output of the magnetic sensor 32 obtained in a cross-sectionally sliced state with respect to the backup roll 12 to be stored in the memory 42 and retained as the magnetic characteristic with respect to the backup roll 12. In some situations, the output of the magnetic sensor can vary according to the rotational speed of the backup roll 12. This gives rise to a need to store, in the memory 42, the output of the magnetic sensor obtained while variously changing the rotational speed.

In the measurement using the trend mode, it is not necessary to move the thickness sensor according to the amount of rotation of the roll. That is, the sensor may be stopped at a requisite position in a scanning region. Specifically, the sensor may be moved by a certain amount from the positional origin, and held at this position.

In this embodiment, the two sheet thickness sensors 16, 18 are provided. Thus, the thickness sensor 16 may be operated in the trend mode, and the thickness sensor 18 may be operated in the profile mode. Alternatively, they may be operated reversely.

(Zero-Adjustment)

Figure 4:
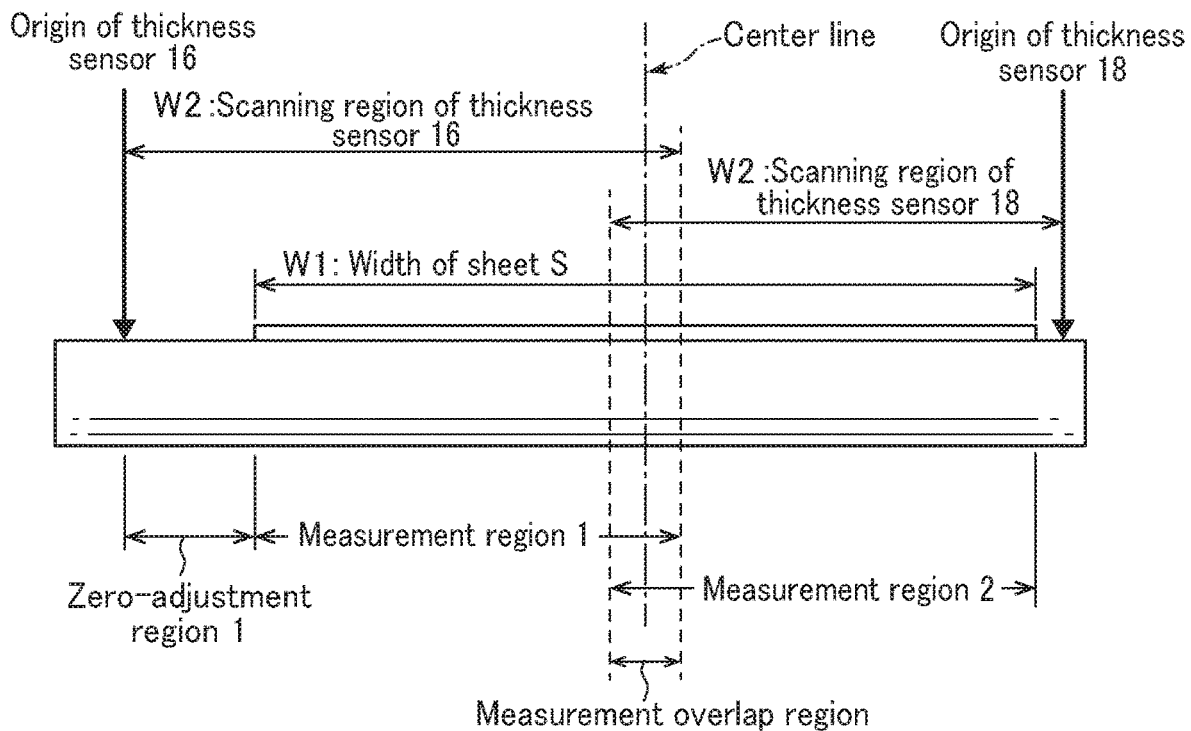
FIG. 4 is an explanatory diagram of a scanning region on a backup roll in the thickness measurement device according to the first embodiment illustrated in FIG. 1.

Next, additionally referring to FIGS. 4 and 5, zero-adjustment of the thickness sensor 16 (18) will be described.

The sheet thickness measurement device 1 is configured such that, when the thickness sensor 16 set at the movement origin receives an origin signal from the backup roll 12, in the state in which the sheet S is present on the backup roll 12, the thickness sensor 16 enters the measurement operation.

What is important here is that a raw measurement result obtained after entering the measurement operation includes an offset error due to a temperature property of each of the magnetic sensor 32 and the optical sensor 33, etc. That is, a correction for a change in output of the magnetic sensor and the optical sensor with respect to the backup roll 12 during the actual measurement is required in addition to a correction based on data measured and stored in the aforementioned measurement setup operation, Specifically, both the optical sensor and the magnetic sensor incorporated in the thickness sensor being operated to scan above the backup roll, and internal circuits thereof, receive an influence of the temperature of the sheet or the like, and thereby an output fluctuation occurs along with temperature changes. This fluctuation is particularly prominent in the magnetic sensor. The present inventor recognizes that a change in output of the thickness sensor due to temperature changes, etc., can be about several ten [μm] in terms of the sheet thickness.

In this specification, this correction is referred to as "zero-adjustment".

Specifically, the zero-adjustment means an operation of, in the state in which the sheet S is present on the backup roll 12, correcting the output of the thickness sensor 16 (18) in a region of the surface of the backup roll 12 where the sheet does not exist, to become zero (offset error correction).

In this embodiment, in the sheet thickness sensor 16 configured to perform the zero adjustment, a scanning width W2 of the thickness sensor 16 is set to a range beyond the width W1 of the sheet S on the surface of the backup roll 12. Then, the raw sheet thickness measurement value is corrected using a thickness measurement value obtained when the sheet thickness sensor 16 performs the scanning operation above a region of the backup roll 12 lying out of the sheet S, during the sheet thickness measurement. Specifically, the correction is performed such that a value of the sheet thickness sensor 16 measured at a position where the sheet does not exist is adjusted to become zero.

The control computer 40 operates to preliminarily figure out whether or not the sheet thickness sensor 16 performs the scanning operation above the sheet, by processing positional information of the thickness sensor 16 in consideration of the width W1 of the sheet S and the scanning width W2 ranging beyond the width W1.

The control computer 40 operates to calculate a zero-adjustment correction value, based on a signal received from the sheet thickness sensor 16 when the sheet thickness sensor 16 is located outside the sheet.

In this situation, the sheet thickness sensor 16 directly scans a position of the backup roll beyond the width of the sheet S, i.e., a region of the surface of the backup roll 12 on which the sheet S is not placed, so that the sheet thickness measurement value must be zero. However, an actual sheet thickness measurement value is not zero. The reason may include a change in property of the sheet thickness sensor 16 due to changes in temperature of the target sheet S and ambient temperature from those in the zero-reading state, and an influence of thermal strain or the like of the backup roll 12, the linear rail 14 or the like. The control computer 40 operates to correct, based on a signal from the sheet thickness sensor 16, a zero-reading correction value which has been already stored, so as to perform the zero-adjustment during the actual scanning operation of the thickness sensor 16.

This zero-adjustment may be performed at given time internals by performing an out-of-sheet scanning operation of the thickness sensor 16 at given time internals.

Figure 5:
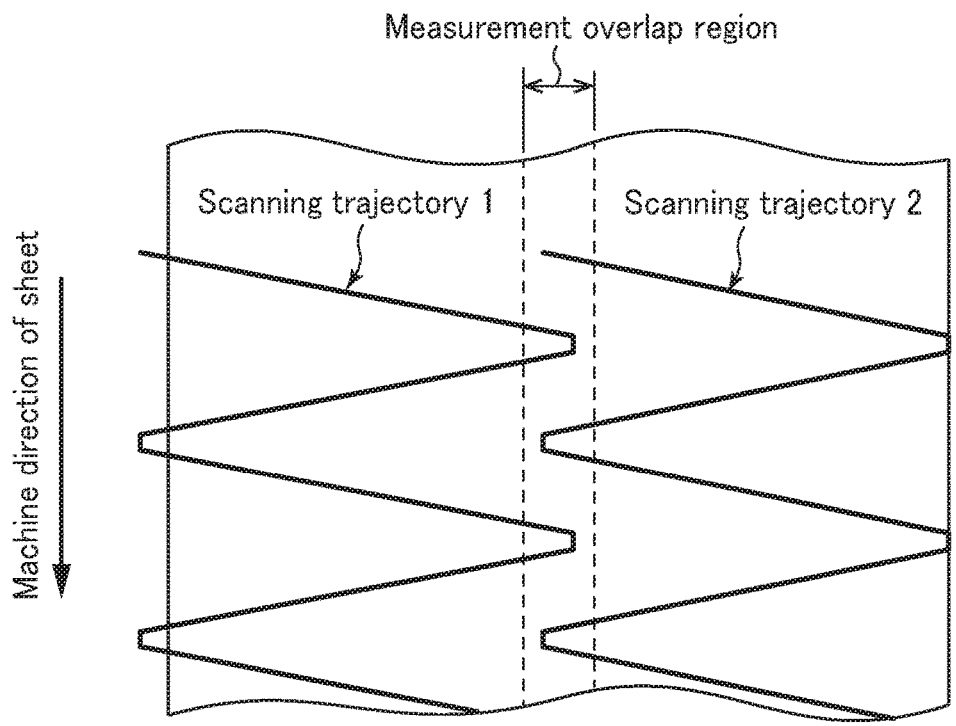
FIG. 5 is an explanatory diagram showing scanning trajectories of the sheet thickness sensors, in a case where the thickness measurement device according to the first embodiment illustrated in FIG. 1 has only one zero-adjustment region on one side of a sheet.

In this embodiment, as shown in FIG. 5, the number of zero-adjustment regions used for the zero-adjustment is one. That is, in this embodiment, only the sheet thickness sensor 16 is configured to perform the zero-adjustment, and the sheet thickness sensor 18 is configured to be scanningly moved within the range of the sheet width, without performing the zero-adjustment operation. Further, the zero-adjustment for the sheet thickness sensor 18 is performed based on a zero-adjustment correction value calculated using measurement results in a overlap region between respective scanning regions of the sheet thickness sensors 16, 18. That is, in the overlay region, the two sensors measure the same sheet region, and thereby the resulting measurement values thereof must be the same. If there is a difference therebetween, a zero-adjustment correction value of the sheet thickness sensor 18 is corrected on the assumption that the zero-adjustment correction value of the sheet thickness sensor 16 is correct.

This makes it possible to keep the width of the backup roll short, without narrowing the width of the sheet. Conversely, the width of the sheet as a target of the thickness measurement can be increased without increasing the width of the backup roll. Further, the zero-adjustment correction value of the sheet thickness sensor 16 is user for the sheet thickness sensor 18, so that it is possible to reduce a burden of the sheet thickness sensor 18, such as a control operation for the zero-adjustment and computation based thereon. Further, by using the two sheet thickness sensors as in this embodiment, it is possible to perform the sheet thickness measurement in a density at least twice that in a case of using one sheet thickness sensor.

Figure 6:
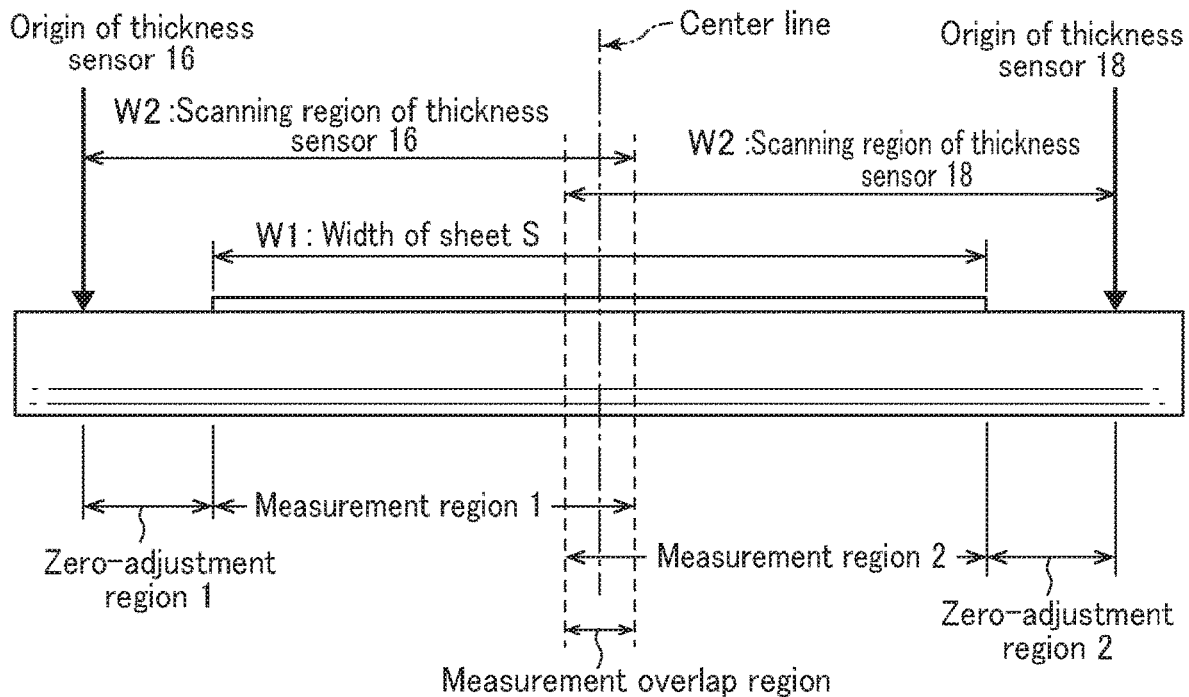
FIG. 6 is an explanatory diagram showing a scanning region on the backup roll, which is different from the scanning region illustrated in FIG. 4.
Figure 7:
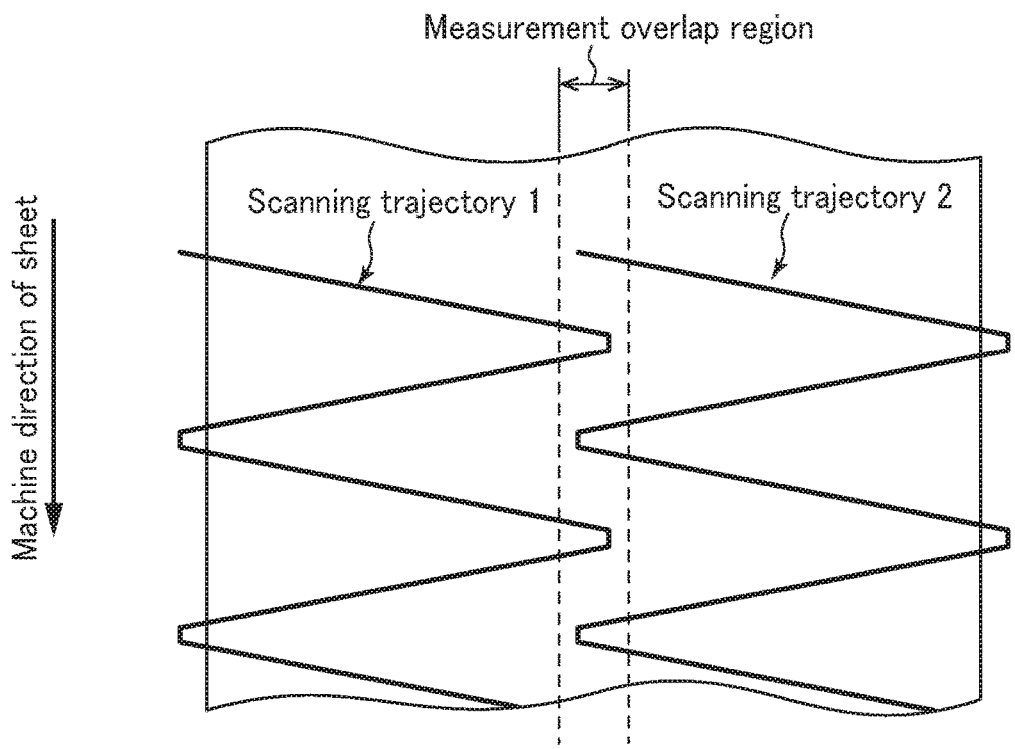
FIG. 7 is an explanatory diagram showing scanning trajectories of the sheet thickness sensors, in a case where the thickness measurement device according to the first embodiment illustrated in FIG. 1 has two zero-adjustment regions, respectively, on both sides of the sheet.

Next, with reference to FIGS. 6 and 6, one modification of the first embodiment will be described. The zero-reading operation and the measurement operation are the same as those in the aforementioned embodiment.

This modified embodiment is different from the aforementioned embodiment in that the zero-adjustment is performed in each of the two thickness sensors 16, 18.

The process of the zero-adjustment is as follows.

Since the sheet thickness measurement in the out-of-sheet region is performed on the surface of the backup roll 12 (in a region of the surface of the backup roll 12 where the sheet does not exist), the thickness measurement value of the thickness sensor 16 (18) must be zero. However, if the thickness measurement value is not zero, the value is stored, and used as data for zero-adjusting a measurement result in a sheet thickness measurement region, The control computer 40 operates to preliminarily figure out whether or not the sheet thickness sensor 16 performs the scanning operation above the sheet, by processing positional information of the thickness sensor 16 in consideration of the width W1 of the sheet S and the scanning width W2 ranging beyond the width W1. Similarly, the control computer 40 operates to preliminarily figure out whether or not the sheet thickness sensor 18 performs the scanning operation above the sheet, by processing positional information of the thickness sensor 18 in consideration of the width W1 of the sheet S and the scanning width W2 ranging beyond the width W1.

Since a measurement result in the measurement region includes an error due to magnetic properties of the backup roll, etc., a correction is performed at each measurement position, in consideration of both a correction value set based on the error and the zero-adjustment (correction of the offset error) to obtain a measurement result.

The thickness sensor 16 and the thickness sensor 18 are located, respectively, on the left side and the right side of the backup roll 12. Thus, the thickness sensor 16 and the thickness sensor 18 are operated to scan, respectively, a left region and a right region of the backup roll 12. The same is applied to a situation where the sheet S is present on the backup roll 12. In this modified embodiment, during the scanning operation, the thickness sensors 16, 18 are operated such that the scanning region of the thickness sensor 18 and the scanning region of the thickness sensor 18 overlap each other. Then, the correction value is adjusted based on measurement results in the overlap region.

In the modified embodiment, the correction value based on the measurement value of the thickness sensor 16 and the correction value based on the measurement value of the thickness sensor 18 are averaged to provide a common correction value to the two sensors.

In the modified embodiment, the two sheet thickness sensors are operated to scan such that they share scanning operations for the right and left sides of the width of the sheet fifty-fifty, and the width of the scanning region is set to range beyond the width of the sheet on each of the right and left sides, so that it is possible to perform the zero-adjustment simply and easily, while quickly responding to a from-moment-to-moment change of the zero point of the sheet thickness measurement device. Further, in the modified embodiment, it is possible to perform the sheet thickness measurement in a density at least twice that in the case of using one sheet thickness sensor, as with the aforementioned embodiment.

In the modified embodiment, the correction value based on the measurement value of the thickness sensor 16 and the correction value based on the measurement value of the thickness sensor 18 are averaged to provide a common correction value to the two sensors. Alternatively, the zero-adjustment may be performed in any other suitable manner.

Next, with reference to FIGS. 8 and 9, a second embodiment of the present invention will be described. The second embodiment relates to a thickness measurement device 100 equipped with three sheet thickness sensors 101, 102, 103 on a linear rail 14.

Figure 8:
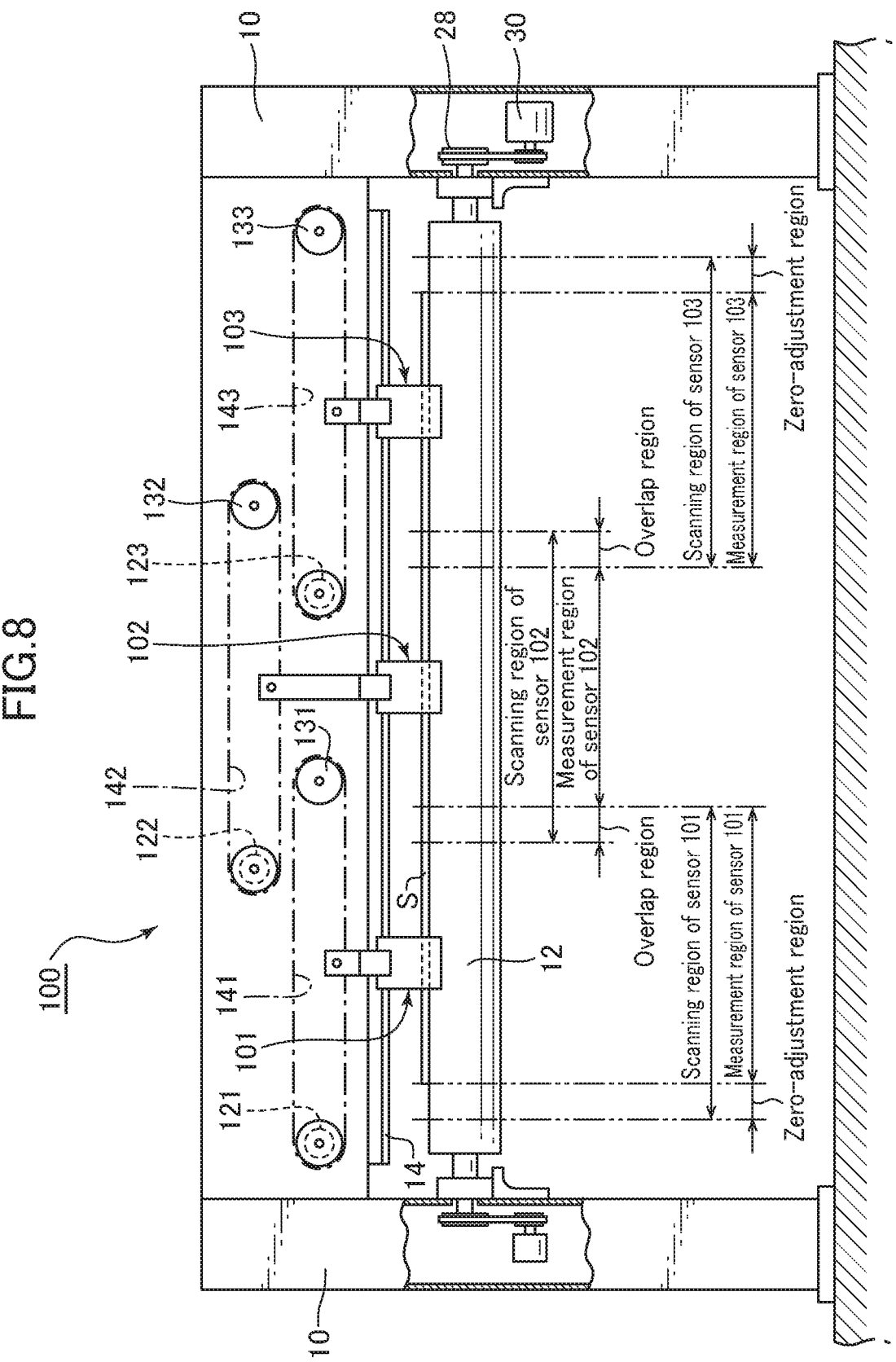
FIG. 8 is a schematic elevation view showing a mechanical configuration part of a sheet thickness measurement device according to a second embodiment of the present invention, wherein the sheet thickness measurement device is equipped with three sheet thickness sensors.
Figure 9:
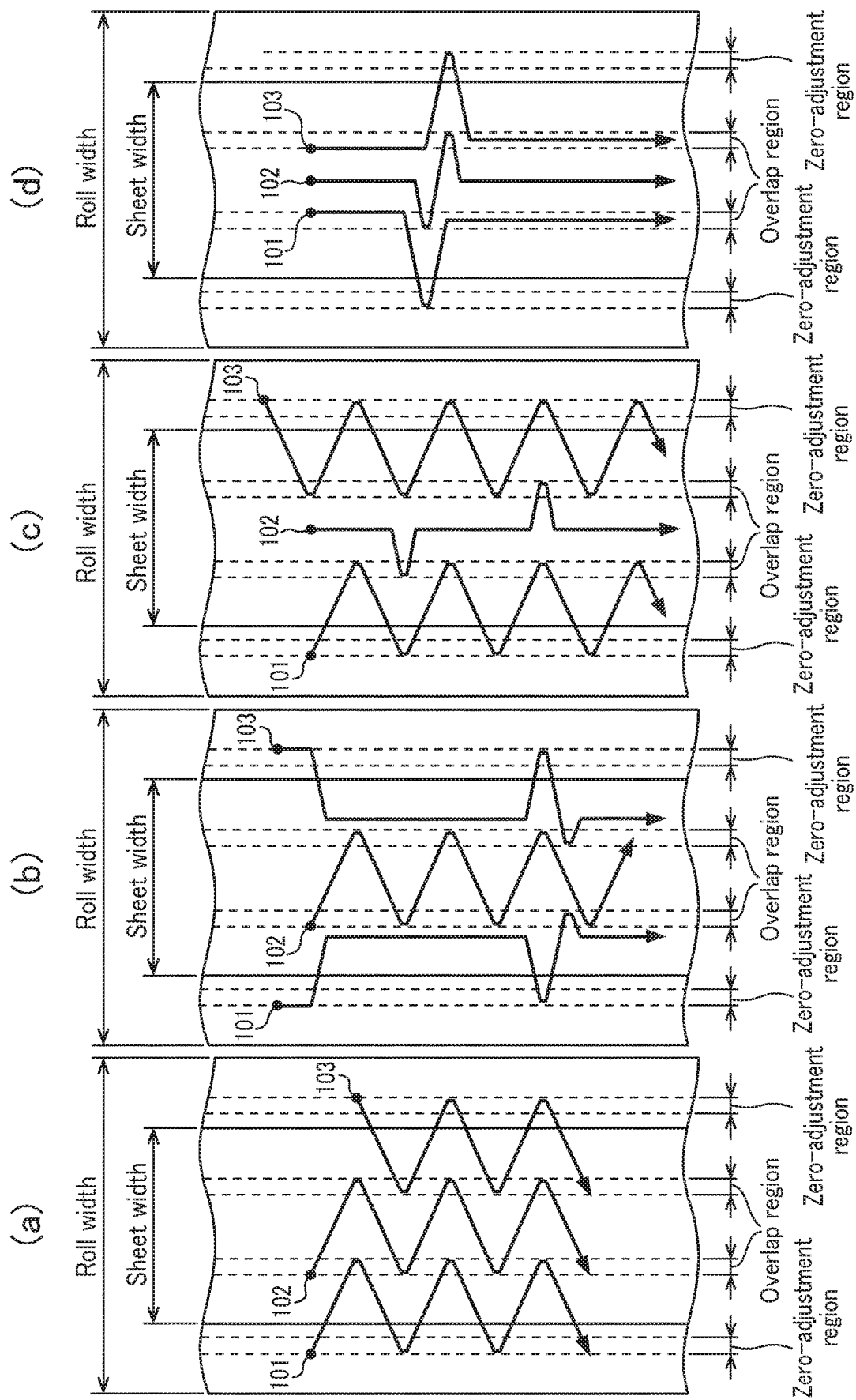
FIGS. 9(a) to 9(d) are explanatory diagrams showing examples of scanning trajectories of the thickness sensors in the second embodiment illustrated in FIG. 8.

In FIGS. 8 and 9, the same element or component as that in the first embodiment designated by a reference sign is assigned with the same reference sign. FIG. 8 shows a configuration for operating the three sheet thickness sensors 101, 102, 103 to scan along the linear rail 14.

As shown in FIG. 8, a metal backup roll 12 is horizontally supported between a pair of support frames 10 extending vertically in spaced-apart relation. Further, the linear rail 14 is also supported between the support frames 10 such that it is disposed just above and in spaced-apart relation to the metal backup roll 12 to extend parallel to the metal backup roll 12. In this embodiment, the three sheet thickness sensors 101, 102, 103 are slidably supported by the linear rail 14.

Each of the sheet thickness sensors 101, 102, 103 is provided with a scanning movement unit, so that they can be positionally controlled individually. Specifically, each of the sheet thickness sensors 101, 102, 103 is connected, respectively, to three chains (timing belts) 141, 142, 143 each wound around between a respective one of three pairs of timing timing pulleys (chain wheels) 131, 132, 133 each driven by a corresponding one of three scanning stepping motors 121, 122, 123.

The sheet thickness sensors 101, 102, 103 are movable along the linear rail 14 independently of each other, according to actuation of the scanning stepping motors 121, 122, 123.

Each of the thickness sensors 101, 102, 103 is configured to output a measurement signal based on measurement operations of a magnetic sensor and an optical sensor. This configuration is the same as that illustrated in FIG. 2.

The operation of the thickness measurement device illustrated in FIG. 8 will be described. The thickness sensors 101, 102, 103 are located, respectively, in the left region, the central region and the right region of the backup roll 12, and configured such that each of a set of the thickness sensors 101, 102 and a set of the thickness sensors 102, 103 can be scanningly moved above the backup roll 12 in the profile mode to pass through an overlap region.

In reference value-storing scanning (measurement setup operation), each of the thickness sensors 101, 102, 103 executes zero-reading of an associated scanning region above the backup roll 12 in a state in which a sheet S is not present on the backup roll 12, and records resulting zero-reading data.

Subsequently, scanning for an actual sheet thickness measurement (measurement scanning) is performed in a state in which a target sheet to be subjected to the thickness measurement is placed on the metal backup roll 12. In the same manner as that in the reference value-storing scanning (measurement setup operation), the sheet thickness sensor 16 is moved from the origin again, and then, every time the sheet thickness sensor 16 reaches each measurement point, a control computer 40 operates to cause a distance measurement value (a distance between the magnetic sensor and the top surface of the metal backup roll 12) from the magnetic sensor 32 at the moment, and a light-blocking width measurement value (a light-blocking width by the metal backup roll 12 and the thickness of the sheet S) from the light-receiving element 38 of the optical sensor, to be stored in a memory 42.

Subsequently, the control computer 40 operates to compute the thickness of the sheet S based on the distance measurement value and the light-blocking width measurement value stored in the memory 42, and output the resulting value through an output circuit 56.

In a measurement operation, the left sheet thickness sensor 101, the central sheet thickness sensor 102 and the right sheet thickness sensor 103 performs the thickness measurement while being scanningly moved in the scanning region independently of each other. Thus, it is possible to perform the sheet thickness measurement in a density at least three times that in the case of using one sheet thickness sensor. As shown in FIGS. 9(a), 9(b), 9(c) and 9(d), the three sheet thickness sensors 101, 102, 103 can be operated in a combination of scanning patterns of profile and trend modes, so that the diversity of the thickness measurement is increased.

In a measurement operation in the trend mode, it is possible to adopt not only a fixed trend mode in which no scanning movement along the linear rail is performed, but also a mode in which the measurement is performed while a measurement position is slightly shifted. By flexibly utilizing the trend mode and the profile mode mixedly and selectively, it is possible to provide a sheet thickness measurement device having flexibility.

A zero-adjustment operation of the thickness measurement device 100 according to the second embodiment will be described. In FIG. 9(a) shows an example in which all the three sheet thickness sensors 101, 102, 103 are operated to scan in the profile mode. In this case, the left and right sheet thickness sensors 101, 103 perform the zero-adjustment in two out-od-sheet regions while being scanningly moved in the profile mode. The central sheet thickness sensor 102 is configured to scan only a region where the sheet exists, and thereby the thermal offset error value in the magnetic sensor and the optical sensor cannot be corrected by itself. However, the zero-adjustment can be performed by comparing respective thickness measurement results of the central sheet thickness sensor 102 and the left or right thickness sensor 101 or 103 in an overlap region in which the measurement region of the central sheet thickness sensor 102 overlaps the measurement region of the thickness sensor 101 or 103, and correcting the thickness measurement result of the central sheet thickness sensor 102 such that it has the same value as that of the left or right thickness sensor 101 or 103.

FIGS. 9(b), 9(c) and 9(d) show examples in which the zero-adjustment is performed in different ways.

As above, the present invention can provide a sheet thickness measurement device capable of increasing measurement density without impairing measurement accuracy, over the entirety of a sheet to be measured.

LIST OF REFERENCE SIGNS

S: sheet
1: sheet thickness measurement device 1
10: support frame
12: metal backup roll
14: linear rail
16, 18: sheet thickness sensor
20, 21: scanning stepping motor
22, 23: timing timing pulley (chain wheel)
24, 25: chain (timing belt)
28: rotary encoder
32: magnetic sensor
34: projector
36: light-receiving lens
38: light-receiving element (linear image sensor)
40: control computer
42: memory
44, 46: operational amplifier
48, 50: A/D converter
101, 102, 103: sheet thickness sensor
121, 122, 123: scanning stepping motor
131, 132, 133: timing timing pulley (chain wheel)
141, 142, 143: chain (timing belt)

The invention claimed is:

1. A sheet thickness measurement device equipped with a plurality of sheet thickness sensors each operable, using a magnetic sensor and an optical sensor, to measure a thickness of a sheet based on output signals from the magnetic sensor and the optical sensor, wherein the sheet thickness measurement device is configured such that the plurality of sheet thickness sensors are operated to scan independently of each other, the sheet thickness measurement device comprising:

a backup roll for supporting the sheet;
scanning means to operate each of the sheet thickness sensors to scan in association with a position of a surface of the backup roll;
without-sheet magnetic data storage means to store therein, in association with the position of the surface of the backup roll, a measurement result regarding a distance between the surface of the backup roll and the magnetic sensor of each of the sheet thickness sensors, obtained from said magnetic sensor at each measurement position by scanningly moving the sheet thickness sensors over an entire region of the surface of the backup roll ranging beyond a width of the sheet, in a state in which the sheet is not present on the backup roll;
without-sheet optical data storage means to store therein, in association with the position of the surface of the backup roll, a measurement result regarding a distance between the surface of the backup roll and the optical sensor of each of the sheet thickness sensors, obtained from said optical sensor at each measurement position by scanningly moving the sheet thickness sensors over the entire region of the surface of the backup roll ranging beyond the width of the sheet, in the state in which the sheet is not present on the backup roll;

without-sheet thickness data forming means to create, based on data stored in the without-sheet magnetic data storage means and the without-sheet optical data storage means, data regarding a distance between the surface of the backup roll and each of the thickness sensors at each measurement position, associated with the position of the surface of the backup roll over the entire region of the surface of the backup roll ranging beyond the width of the sheet;

with-sheet magnetic data storage means to store therein, in association with the position of the surface of the backup roll, a measurement result regarding a distance between a surface of the sheet and the magnetic sensor of each of the sheet thickness sensors, obtained from said magnetic sensor in a state in which the sheet is present on the backup roll;

with-sheet optical data storage means to store therein, in association with the position of the surface of the backup roll, a measurement result regarding a distance between the surface of the sheet and the optical sensor of each of the sheet thickness sensors, obtained from said optical sensor in the state in which the sheet is present on the backup roll;

with-sheet thickness data forming means to create, based on data stored in the with-sheet magnetic data storage means and the with-sheet optical data storage means, data regarding a distance between the surface of the sheet and each of the thickness sensors, associated with the position of the surface of the backup roll;

reference measurement value setting means to associate a difference between the data of the without-sheet thickness data forming means and the data of the with-sheet thickness data forming means, with the position of the surface of the backup roll, to set a reference measurement value of the sheet thickness;

with-sheet magnetic correction data storage means provided in at least one of the plurality of thickness measurement sensors to store therein, in association with the position of the surface of the backup roll, a measurement result regarding a distance between the surface of the backup roll and the magnetic sensor of the at least one thickness measurement sensor, obtained from said magnetic sensor in the state in which the sheet is present on the backup roll and above a region of the backup roll beyond a range in which the sheet is present on the backup roll;

with-sheet optical correction data storage means provided in the at least one thickness measurement sensor to store therein, in association with the position of the surface of the backup roll, a measurement result regarding a distance between the surface of the backup roll and the optical sensor of the at least one thickness measurement sensor, obtained from said optical sensor in the state in which the sheet is present on the backup roll and in the region on the backup roll beyond the range in which the sheet is present on the backup roll; and zero-adjustment correction data forming means to create, based on data stored in the with-sheet magnetic correction data storage means and the with-sheet optical correction data storage means, zero-adjustment correction data regarding the distance between the surface of the sheet and the at least one sheet thickness sensor, associated with the position of the surface of the backup roll, wherein the sheet thickness measurement device is configured to, based on the zero-adjustment correction data created by the zero-adjustment correction data forming means, subject the reference measurement values of the sheet thickness at each measurement position of the at least one sheet thickness sensor, set by the reference measurement value setting means, to zero-adjustment, in association with the position of the surface of the backup roll, thereby obtaining final measurement values of the sheet thickness at each measurement position.

2. The sheet thickness measurement device as recited in claim 1, which comprises a support mechanism supporting the plurality of sheet thickness sensors to allow each of the sheet thickness sensors to scan the sheet on the backup roll independently.

3. The sheet thickness measurement device as recited in claim 2, wherein the plurality of sheet thickness sensors are composed of two sheet thickness sensors which are attached to the support mechanism such that they can be operated to scan above the backup roll independently of each other.

4. The sheet thickness measurement device as recited in claim 2, wherein the plurality of sheet thickness sensors are composed of three sheet thickness sensors which are attached to the support mechanism such that they can be operated to scan above the backup roll independently of each other.

5. The sheet thickness measurement device as recited in claim 2, wherein the support mechanism comprises a single linear rail supporting the plurality of sheet thickness sensors in a movable manner.

6. The sheet thickness measurement device as recited in claim 1, which is configured such that each of the sheet thickness sensors is operated to scan above the surface of the backup roll in a non-contact state with respect to the backup roll.

7. The sheet thickness measurement device as recited in claim 1, wherein the remaining one or more sheet thickness sensors other than the at least one sheet thickness sensor are subjected to zero-adjustment, based on the measurement result pertaining to the zero-adjustment for the at least one sheet thickness sensor.

8. The sheet thickness measurement device as recited in claim 1, wherein each of the sheet thickness sensors comprises a projector configured to emit light onto a top region of the sheet lying on the backup roll, and a light-receiving element comprised of a plurality of pixels configured to receive the light emitted from the projector, wherein each of the sheet thickness sensors is configured to determine a position of a top of the sheet, based on a change in luminous intensity of the light-receiving element over the plurality of pixels, and obtain the sheet thickness, based on the determined position of the top of the sheet.

* * * * *